March 13, 1928.
W. J. FALLON, JR
1,662,495
WELTING FOR BOOTS AND SHOES
Filed April 7, 1927
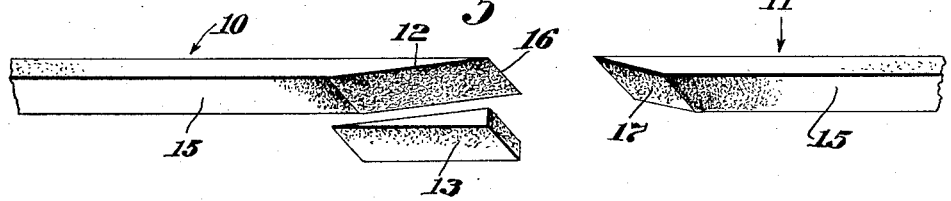
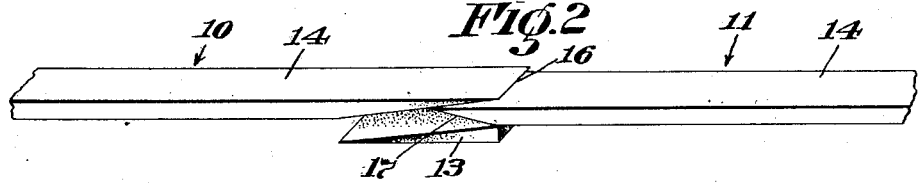
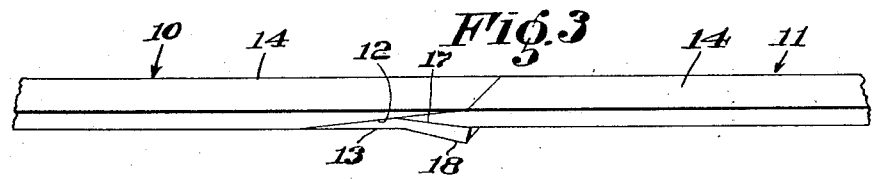
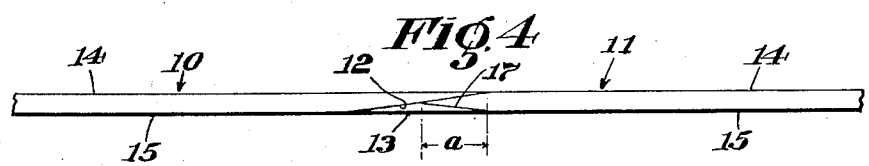
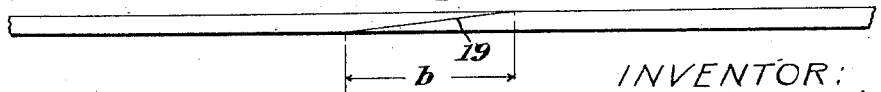
INVENTOR:
William J. Fallon, Jr.,
BY
ATTORNEY Patented Mar. 13, 1928.

1,662,495

UNITED STATES PATENT OFFICE.

WILLIAM J. FALLON, JR., OF BOSTON, MASSACHUSETTS.

WELTING FOR BOOTS AND SHOES.

Application filed April 7, 1927. Serial No. 181,856.

This invention relates to welting for boots and shoes formed of welt strips the ends of which are secured together by a new type of joint, and also to a method of securing the ends of the welt strips together.

Welting is made from a plurality of leather strips the ends of which are scarfed and cemented together. In order to produce a joint having the desired strength and which is sufficiently flexible to permit the welt to conform readily to the shape of the shoe, it has been customary heretofore to provide the ends of the welt strips to be united with a long scarfing cut and to overlap the scarfed ends a substantial amount.

The use of these long overlapping joints at the opposite ends of each strip of welt involves a substantial loss in welt stock, and the present invention therefore relates to a novel form of joint for welt strips that is strong and durable and which produces a substantial saving in welt stock.

The novel features of the present invention will be made clear from the following description and the accompanying drawings of one good form of the invention.

In the drawings:

Fig. 1 is a perspective view of two separate pieces of welt the ends of which are cut ready to be secured together in accordance with the present invention;

Fig. 2 is a perspective view showing the parts of Fig. 1 spaced slightly from their final position;

Fig. 3 is a similar view showing the parts of Fig. 2 cemented together;

Fig. 4 is an edge view showing the finished joint after a protruding portion shown in Fig. 3 has been sheared off; and Fig. 5 is an edge view showing the old type of welt joint commonly employed heretofore.

Referring to Figs. 1 to 4 inclusive of the drawings, 10 and 11 are two pieces of welt the ends of which are to be secured together to form a strip of welting, it being understood that any number of such pieces of welt may be similarly joined together to form a strip of welting of the desired length.

In accordance with the present invention one piece of welt such as 10 has its end cut or scarfed, as shown, with a long scarfing cut that forms the scarfed face 12 and the wedge-shaped piece of welt removed by the scarfing cut is designated by 13.

It is assumed that the grain or hair side of the welt is at the face 14 and that the flesh side of the welt is at the face 15, and it is important that the scarfing cut above mentioned be formed as shown so that it removes the flesh portion of the welt while it leaves the grain portion intact. That is, the cut is so formed that the thickness of the scarfed end decreases toward the grain surface 14 of the welt and the feathered edge 16 lies at the grain or hair side of the welt.

The welt strip 11 is likewise provided with a beveled end portion formed by a cut that removes the flesh portion of the welt and leaves the grain portion intact, but this scarfed or beveled end portion 17 may be much shorter than the scarfed face 12, as will be apparent from the drawings.

The pieces of welt 10 and 11 having their ends scarfed as indicated by 12 and 17 are secured together in accordance with the present invention by cementing the thin end portion of the welt 10 to the grain face of the welt 11, and it should be noted that the end portions of the welt strips overlap only a short distance as compared with the length of the scarfed face 12. The grain face 14 of the welt 11 is not beveled to receive the overlapping portion 12 of the welt 10, as will be apparent from Fig. 1, but it is desirable to buff the grain face of the welt 11 just enough to remove the smooth film-like outer surface so that the adhesive will more firmly grip the face of the strip 11. It is found that when the thin beveled end portion 16 is secured to the grain face of the welt 11 in the manner just described a smooth highly flexible joint is formed which will not open up even when the welting joint is bent at a sharp angle.

When the ends of the two strips 10 and 11 are secured together in the manner just described the thickness of the joint thus formed will be less than the normal thickness of either strip of welt. This thickness is readily increased by cementing to the flesh side of the joint the wedge shaped piece 13 above mentioned. That is, the tapered face of this piece 13 is cemented to the tapered face 12 from which it was cut, thus forming a smooth joint at the flesh side of the welting, and since a portion of the piece 13 is cemented to the beveled face 17 the strength of the joint is materially increased by the bridging or overlapping action of the piece 13.

After the parts are cemented together as shown in Fig. 3 the protruding portion 18 of the wedge shaped element 13 may be sheared off to form the smooth flat joint shown in Fig. 4.

It will be apparent from the foregoing that by constructing the joint in accordance with the present invention the scarfed ends of the welt pieces 10 and 11 need be overlapped only to the extent indicated by *a* in Fig. 4, whereas heretofore it has been necessary to provide each piece of welt with the long scarf 19 (see Fig. 5) and to overlap the welt ends the amount indicated by *b*. The pronounced saving in welt stock by forming the joint in accordance with the present invention is at once apparent from Figs. 4 and 5 of the drawing wherein it will be seen that the overlap of the ends in Fig. 4 need not be more than about one half of the overlap of the ends in Fig. 5. Furthermore, since the beveled end of the strip 11 lies between the end portion 16 of the strip 10 and the overlapping portion 13, the end portion 17 is well protected and is firmly attached to the welt strip 10 by both pieces of leather between which it is secured. As a result a strong, highly flexible joint is produced while at the same time a substantial saving in welt stocks is secured.

While the present invention has been described as applied to welting for boots and shoes, it will be apparent that the joint forming the subject matter of the present invention is well adapted for use in connection with belting, since the same type of joint may be employed to secure strips of leather together to form a leather belt or belting of any desired length.

What is claimed is:—

1. As an article of manufacture, a strip of welting for use in making boots and shoes having a joint therein comprising two separate pieces of welt each of which is scarfed to form a feather edge at the hair side of the welt and having the scarfed portions superimposed in overlapping relation and secured together by cementing the scarfed face of one to the hair side of the other, and having a filler strip secured across the joint.

2. As an article of manufacture, a strip of welting for use in making boots and shoes having a joint therein comprising two separate pieces of welt one of which has the flesh portion at the end of the welt removed by a long scarfing cut and the other has the flesh portion removed by a short scarfing cut and having the grain portions at the scarfed ends overlapped and secured together by cementing the scarfed face of one piece to the grained face of the other piece, and having a strengthening strip secured across the joint.

3. As an article of manufacture, a strip of welting for use in making boots and shoes having a joint therein comprising two separate pieces of welt each of which has the flesh portion at the end of the welt removed by a scarfing cut and having the grain portions at the scarfed ends overlapped and secured together, and having a strengthening strip secured across the joint.

4. As an article of manufacture, a strip of welting for use in making boots and shoes having a joint therein comprising two separate pieces of welt each of which has the flesh portion at the end of the welt removed from the grain portion by a scarfing cut and having the scarfed face of one piece of welt cemented directly to the grain surface of the other piece of welt, and having a strengthening strip secured to the joint at the flesh side of the two pieces of welt.

5. As an article of manufacture, a strip of welting for use in making boots and shoes having a joint therein comprising two separate pieces of welt each of which has a scarfed end and one piece of welt having its scarfed face cemented directly to the unscarfed surface of the other scarfed piece of welt, and having a bridging strip secured across the joint.

6. A method of uniting separate pieces of welt to form a strip of welting, which consists in scarfing the ends of two pieces of welt so that one scarfing cut is much longer than the other and the thickness of each end decreases toward the grain side of the welt, then cementing the end portion having the longest scarfing cut to the grain surface of the other scarfed piece of welt, and then securing a bridging strip across the joint.

7. A method of uniting separate pieces of welt to form a strip of welting, which consists in scarfing the ends of two pieces of welt so that one scarfing cut is longer than the other and the thickness of each end decreases toward the grain side of the welt, then cementing the end portion having the longest scarfing cut to the grain surface of the other scarfed piece of welt, and cementing to the longest scarfed face the piece of welt that was cut there from so that this piece of welt overlaps the scarfed end of the other piece of welt.

In testimony whereof, I have signed my name to this specification.

WILLIAM J. FALLON, Jr.